No. 866,438. PATENTED SEPT. 17, 1907.
R. L. DAVIS.
SHAVING BRUSH.
APPLICATION FILED JAN. 17, 1907.
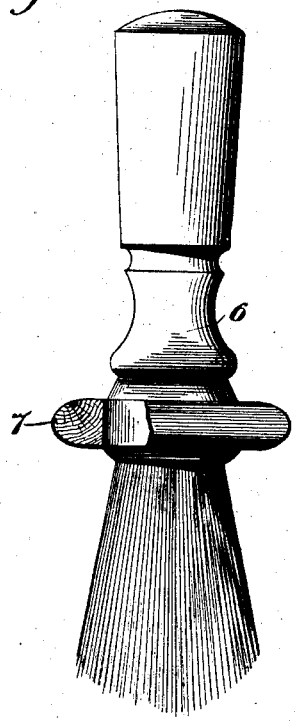
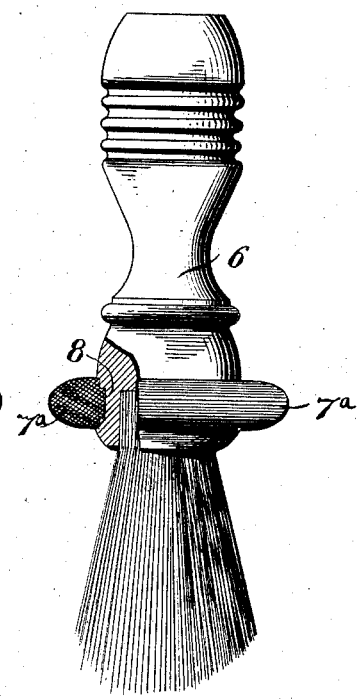
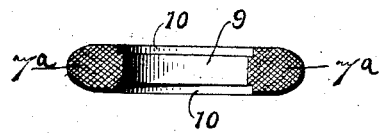
Witnesses:
Jas. Es. Hutchinson
Francis R. Willer
Inventor:
Robert L. Davis,
By Burnham, Attorney.

UNITED STATES PATENT OFFICE.

ROBERT LEE DAVIS, OF STAR, NORTH CAROLINA.

SHAVING-BRUSH.

No. 866,438.  Specification of Letters Patent.  Patented Sept. 17, 1907.

Application filed January 17, 1907. Serial No. 352,750.

*To all whom it may concern:*

Be it known that I, ROBERT LEE DAVIS, a citizen of the United States, residing at Star, in the county of Montgomery and State of North Carolina, have invented certain new and useful Improvements in Shaving-Brushes, of which the following is a specification, reference being had therein to the accompanying drawing.

This invention provides a shaving-brush with an annular projection so arranged as to be conveniently used to rub lather into the skin and to cause the beard to come boldly out from the skin, whereby the beard may be more easily severed by a razor and a close shave insured. The invention also contemplates a laterally-projecting ring for this purpose which is removable and which does not at all interfere, when in place on the brush, with the ordinary uses of the brush.

The details of construction and arrangement of parts contemplated by this invention will be apparent from the detail description hereinafter, when read in connection with the accompanying drawings, forming part hereof, wherein a preferable embodiment of the invention is disclosed, for purposes of illustration.

Like reference-characters refer to corresponding parts in the several views of the drawings, of which—
Figure 1 is a view of a form of shaving-brush with my attachment affixed; Fig. 2 is a view of another form of shaving-brush to which is also affixed my attachment; and Fig. 3 is a view of the ring.

Referring more particularly to the drawings, 6 designates a shaving-brush of any usual form, on the handle of which, preferably near the brush proper, is disposed a laterally-projecting annulus or ring 7, of rubber, wood, bone, or any other suitable material. The ring is so formed that it extends beyond the contour of the handle and its periphery constitutes a rubbing surface materially removed from the handle, so that the skin may be rubbed with the ring without being engaged by the handle. This ring may be made integral with the handle, or it may be made of different material and held on the handle by frictional contact, glue, or in any other suitable manner.

When it is desired to have a readily-removable ring, the handle may or may not be formed with a circumferential groove or seat 8, as shown in Fig. 2, and the ring in this case designated by 7ª is made of rubber or of any other elastic material which will permit it to be forced over the handle and into the desired place thereon, the ring seating in the groove when a groove is used. The ring may also be formed on its inner periphery with an annular projection 9 to seat in groove 8 and leaving a surface 10 on each side of greater diameter to engage the periphery of the handle.

Having thus described my invention, what I claim as new, and desire to secure by Letters Patent, is—

1. In combination with the handle of a shaving-brush having a circumferential groove thereon, a ring having an annular projection arranged to seat in said groove, said ring extending beyond the contour of the brush and forming a rubbing surface removed from the surface of the brush.

2. In combination with the handle of a shaving-brush having a circumferential groove thereon, an elastic ring having an annular projection arranged to seat in said groove, said ring extending beyond the contour of the brush and forming a rubbing surface removed from the surface of the brush.

In testimony whereof I affix my signature in presence of two witnesses.

ROBERT LEE DAVIS.

Witnesses:
 FRANK AUMAN,
 GEORGE W. STUART.